United States Patent
Kim et al.

(10) Patent No.: US 7,424,054 B2
(45) Date of Patent: Sep. 9, 2008

(54) CARRIER RECOVERY APPARATUS AND METHODS FOR HIGH-DEFINITION TELEVISION RECEIVERS

(75) Inventors: Min-ho Kim, Gyeonggi-do (KR); Do-jun Rhee, Kyungki-do (KR); Dong-seog Han, Daegu Metropolitan (KR); Jung-jin Kim, Daegu Metropolitan (KR)

(73) Assignee: Samsung Electronics Co., Ltd. (KR)

( * ) Notice: Subject to any disclaimer, the term of this patent is extended or adjusted under 35 U.S.C. 154(b) by 917 days.

(21) Appl. No.: 10/675,400

(22) Filed: Sep. 30, 2003

(65) Prior Publication Data
US 2004/0109670 A1    Jun. 10, 2004

(30) Foreign Application Priority Data
Oct. 7, 2002   (KR) ............ 10-2002-0061041

(51) Int. Cl.
*H03K 5/159*   (2006.01)
(52) U.S. Cl. .................................. 375/232
(58) Field of Classification Search ............ 375/229, 375/230, 232, 277, 354, 365, 368, 376; 386/46, 386/66, 85; 348/614, 622, 725, 507, 526, 348/536, 726, 500
See application file for complete search history.

(56) References Cited

U.S. PATENT DOCUMENTS

| 6,967,694 B1 | 11/2005 | Ninomiya et al. ......... 348/726 |
| 2001/0033625 A1 | 10/2001 | Ninomiya et al. ......... 375/316 |

FOREIGN PATENT DOCUMENTS

| KR | 1019940007633 | * | 4/1994 |
| KR | 1019950043526 | * | 11/1995 |
| KR | 1019990022567 | * | 6/1999 |

* cited by examiner

*Primary Examiner*—Sam K Ahn
(74) *Attorney, Agent, or Firm*—Myers Bigel Sibley & Sajovec, P.A.

(57) ABSTRACT

A carrier recovery apparatus, which may used in a high-definition TV receiver, includes an error compensating unit, an error detecting unit, and an oscillator. The error compensating unit combines a complex input signal with a frequency signal to generate a complex output signal. The complex output signal includes an error reference signal. The error detecting unit determines a location of the error reference signal in the complex output signal based on a real part of the complex output signal, and generates an error signal based on the location of the error reference signal. The oscillator generates the frequency signal with a frequency that varies based on the error signal. The complex input signal may be a VSB signal that is represented as a complex number, and the error reference signal may be a PN63 signal in a field synchronization signal of the complex input signal.

31 Claims, 10 Drawing Sheets

CARRIER RECOVERY APPARATUS AND METHODS FOR HIGH-DEFINITION TELEVISION RECEIVERS

BACKGROUND OF THE INVENTION

This application claims priority from Korean Patent Application No. 10-2002-0061041, filed 7 Oct. 2002 in the Korean Intellectual Property Office (KIPO), which is incorporated herein in its entirety by reference.

FIELD OF THE INVENTION

The present invention relates to receivers for use with a high-definition television (hereinafter, referred to as "HD TV") signal, and more particularly, to carrier recovery apparatus and methods that recover a carrier wave signal in, for example, a HD TV signal.

BACKGROUND

High-definition television receivers which are compatible with the advanced television systems committee (ATSC) standard receive a transmission signal that includes a pilot signal. Example transmission signals that include a pilot signal in a carrier wave include vestigial sideband (VSB) signals, double sideband (DSB) signals, and single sideband (SSB) signals. The pilot signal may be used to recover the carrier wave in a received signal.

FIG. 1 illustrates a data frame structure of a VSB signal. A data frame consists of two fields, and each field consists of 313 segments. A segment, which is a basic unit of a data frame, includes 832 symbols, and a segment synchronization signal having four symbols is provided at a beginning part of each segment.

A first segment of a field is a field synchronization signal that has a pattern that is known in advance by a transmitter and a receiver. The field synchronization signal is generated at predetermined instances of time. The other 312 segments, except for the first segment, contain data.

FIG. 2 illustrates the structure of the field synchronization signal shown in FIG. 1. Referring to FIG. 2, the field synchronization signal of FIG. 1 includes a PN511 signal, three PN63 signals, and a VSB mode signal. A field synchronization signal is included in every field and, thus, a PN511 signal, three PN63 signals, and a VSB mode signal are also included in each field.

FIG. 3 is a block diagram of a high-definition television receiving system 300. Operations for receiving a carrier wave in the receiving system 300 will now be described with reference to FIG. 3. First, a carrier wave signal input, received by an antenna, is applied to a tuner 310. The tuner 310 converts the received carrier wave signal into a signal of a certain bandwidth in response to a fixed local oscillating signal.

The signal output by the tuner 310 is filtered by a surface acoustic wave (SAW) filter 320 to provide a signal having certain bandwidth. Because the SAW filter 320 allows only signals of certain bandwidths to pass through, distortions in the carrier wave signal may result in the pilot signal being blocked by the SAW filter 320. Consequently, a carrier recovery device 350 may not be able to detect the pilot signal, and which may prevent recovery of the carrier wave.

The signal output by the SAW-filter 320 is amplified through an intermediate frequency (IF) amplifier 330, converted into a digital signal INS by an analog-to-digital converter (ADC) 340, and a sampled signal is detected by a symbol timing recovering unit 360.

The digital signal INS from the ADC 340 is recovered by the carrier recovery device 350. A carrier recovery loop 370 recovers a carrier wave using a pilot signal in a carrier wave signal. Deviation of a pilot signal from the pass-through bandwidth of the SAW filter 320, because of, for example, distortion in the carrier wave signal, can result in a frequency offset, i.e., an offset between a carrier frequency and a demodulating frequency. The carrier recovery device 350 and the carrier recovery loop 370 extract the frequency offset between the carrier wave signal and the demodulated frequency, and operate as loops for compensating for the frequency offset and for compensating for phase errors.

A pilot signal may, however, weaken or vanish due to noise from, for example, multi-path affects on a transmission signal. Consequently, a receiving system may not be able to recover a carrier wave. Additionally, significant time may be necessary to synchronize a carrier wave when a large carrier wave frequency error occurs in an early stage in the recovery of the carrier wave using the pilot signal.

SUMMARY OF THE INVENTION

Some embodiments of the present invention provide a carrier recovery apparatus that may be used in a high-definition TV receiver. The carrier recovery apparatus includes an error compensating unit, an error detecting unit, and an oscillator. The error compensating unit combines a complex input signal with a frequency signal to generate a complex output signal. The complex output signal includes an error reference signal. The error detecting unit determines a location of the error reference signal in the complex output signal based on a real part of the complex output signal, and generates an error signal based on that location. The oscillator generates the frequency signal with a frequency that varies based on the error signal. The complex input signal may be a VSB signal that is represented as a complex number, and the error reference signal may be a PN63 signal in a field synchronization signal of the complex input signal.

The carrier recovery apparatus may be used to quickly recover a carrier even when a pilot signal is difficult to detect. For example, in some embodiments, a PN63 signal that is contained in a field synchronization signal of a VSB signal is used to recover the carrier.

Some other embodiments of the present invention provide a method of recovering a carrier in a complex high-definition TV signal. The presence or absence of a pilot signal in the complex high-definition TV signal is detected. A selection is then made between performing a first error detecting function on the complex high-definition TV signal and performing a second error detecting function on the complex high-definition TV signal based on the detected presence or absence of the pilot signal in the complex high-definition TV signal. In some further embodiments, the first error detecting function uses the PN63 signal that is contained in a field synchronization signal of the VSB signal to recover the carrier. The second error detecting function may recover the carrier using the pilot signal. Accordingly, the carrier may be recovered using the pilot signal when it is available, and may otherwise use the PN63 signal to recover the pilot signal.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numerals refer to like elements throughout.

As will be appreciated by one of skill in the art, the present invention may be embodied as methods and apparatus. Accordingly, the present invention may take the form of an entirely hardware embodiment, an entirely software embodiment or an embodiment combining software and hardware aspects, all of which are generally referred to herein as "device", "apparatus", and "unit". The present invention is described below with reference to flowchart illustrations and/or block diagrams of methods and apparatus or receivers according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 4:
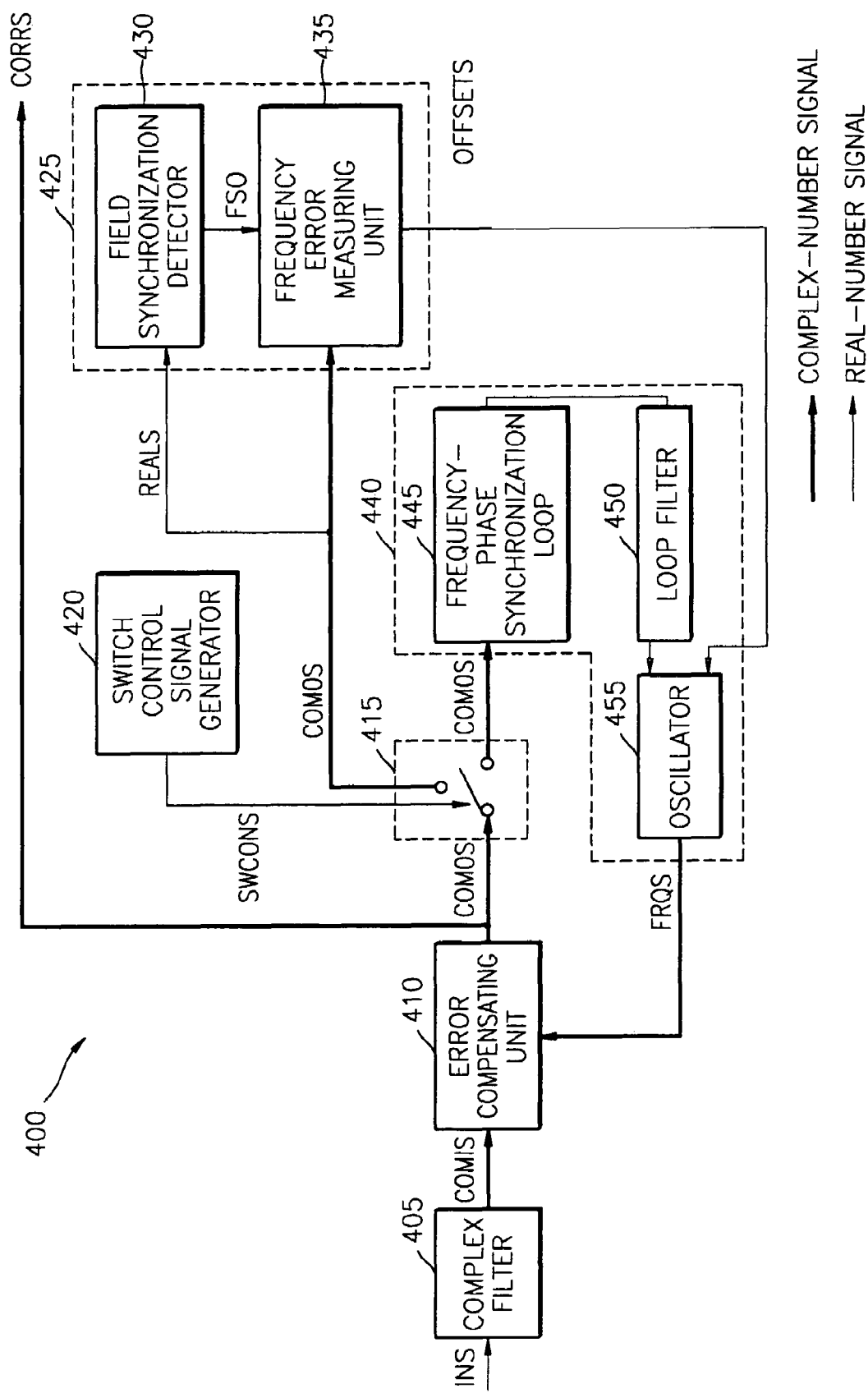
FIG. 4 is a block diagram of a carrier recovery apparatus according to a first embodiment of the present invention.
Figure 5:
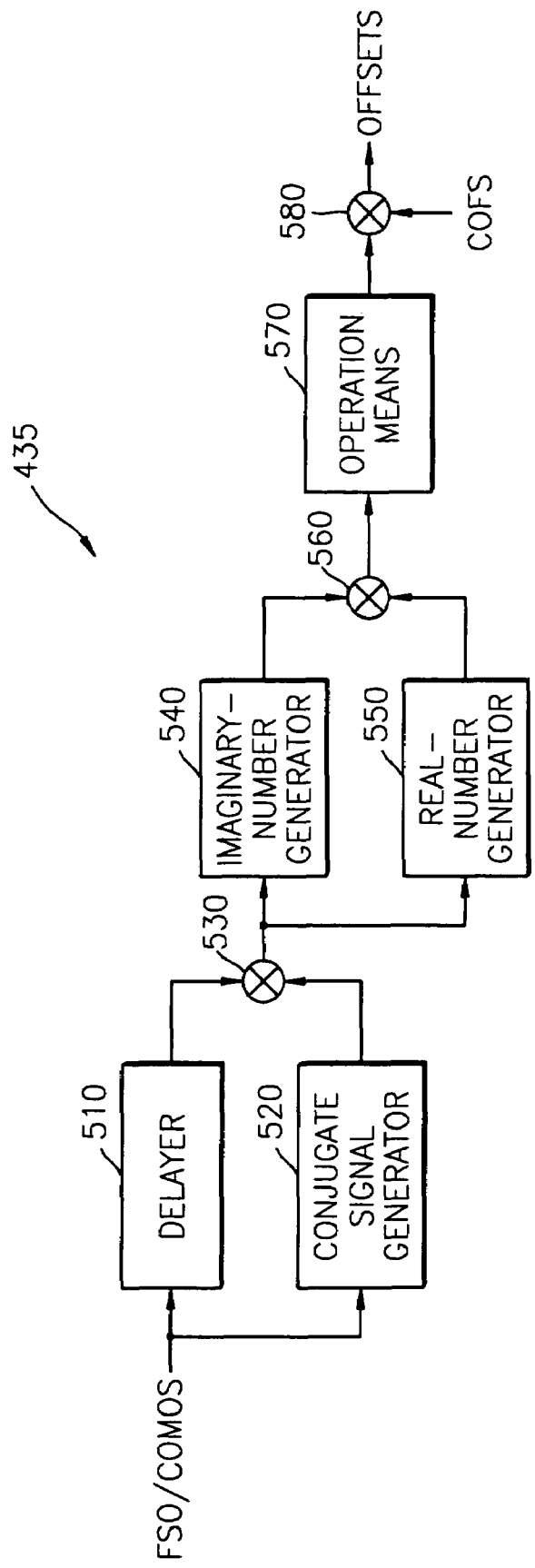
FIG. 5 is a block diagram of a frequency error measuring unit, for example, as shown in FIG. 4, according to embodiments of the present invention.

FIG. 4 is a block diagram of a carrier recovery device (apparatus) 400 according to a first embodiment of the present invention, and FIG. 5 is a block diagram of a frequency error measuring unit such as, for example, as shown in FIG. 4.

Referring to FIGS. 4 and 5, the carrier recovery device 400 includes an error compensating unit 410, a switching unit 415, a switch control signal generator 420, a first error detecting unit 425, and a second error detecting unit 440.

The error compensating unit 410 multiplies a complex input signal COMIS that includes a real number portion and an imaginary number portion by a predetermined frequency signal FRQS that is output from the second error detecting unit 440, and outputs the multiplication result as a complex output signal COMOS.

Figure 1:
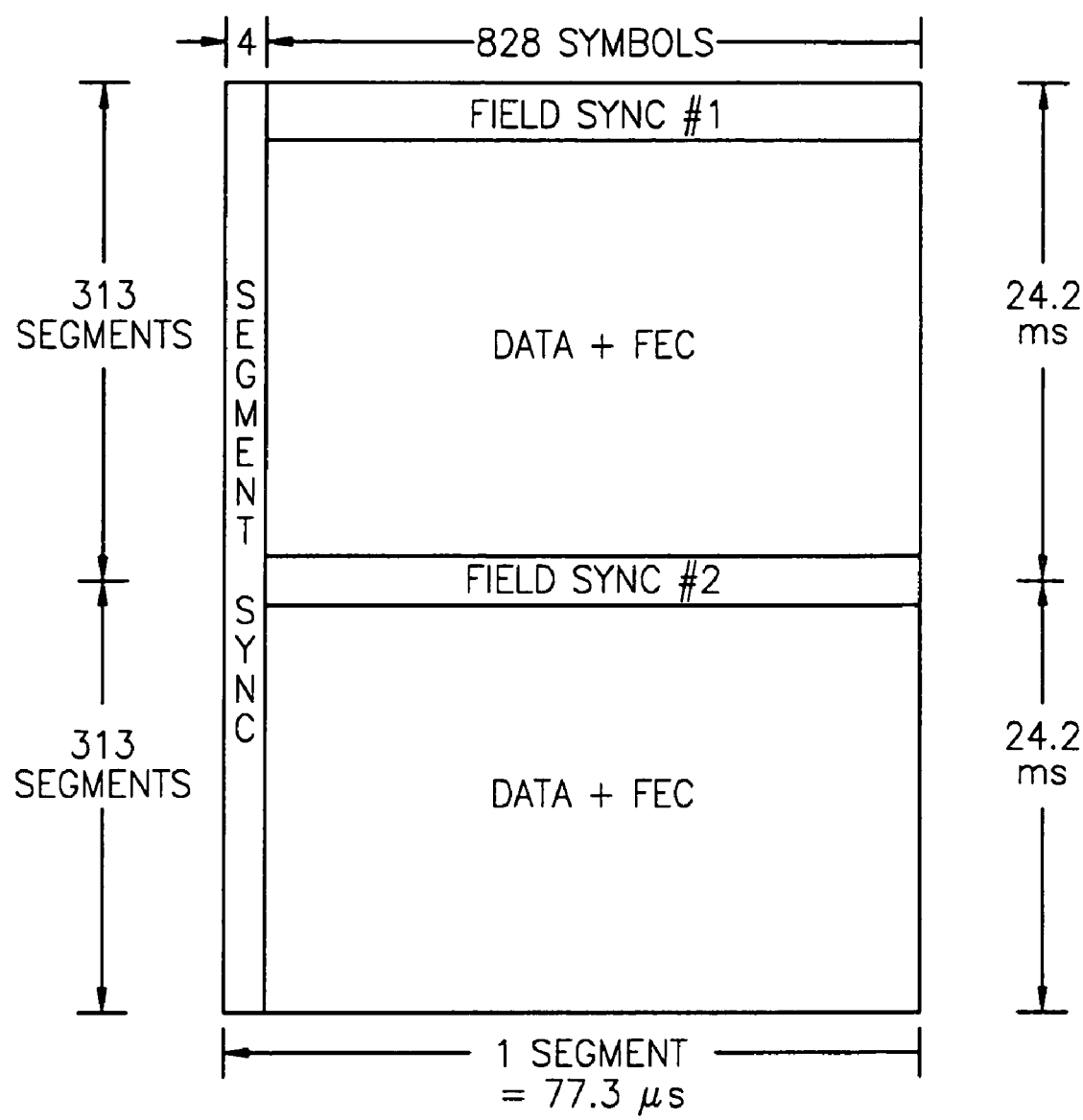
FIG. 1 illustrates a data frame structure of a vestigial sideband (VSB) signal according to the prior art.
Figure 2:
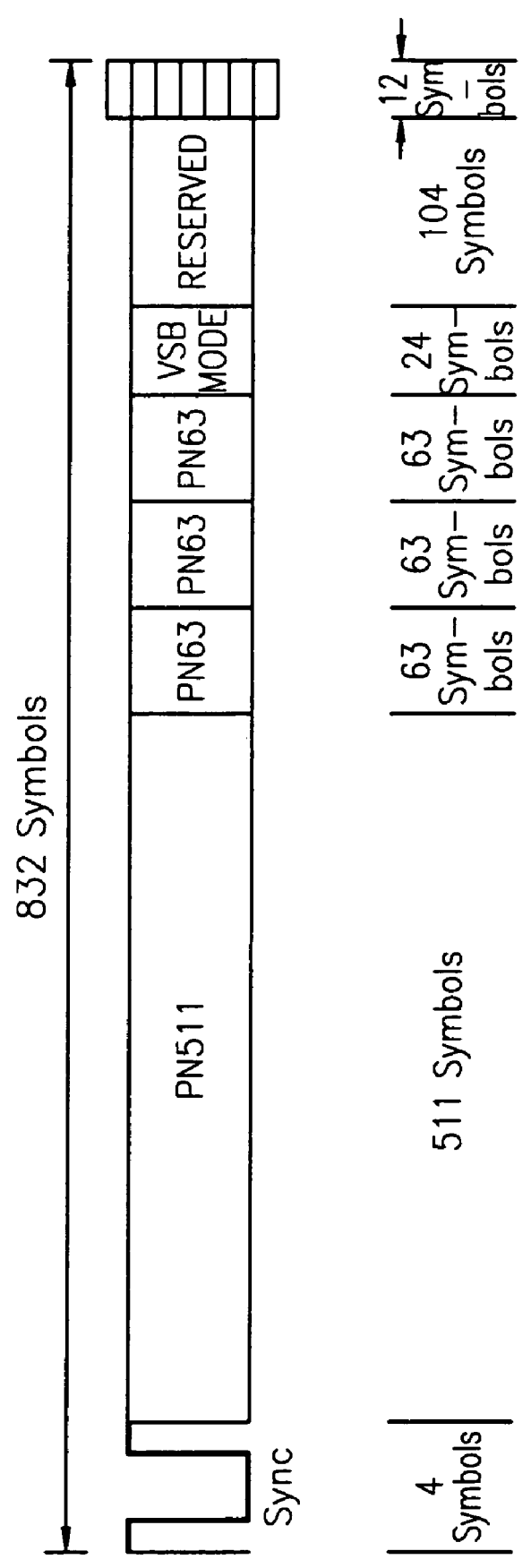
FIG. 2 illustrates the structure of a field synchronization signal of the VSB signal of FIG. 1 according to the prior art.
Figure 3:
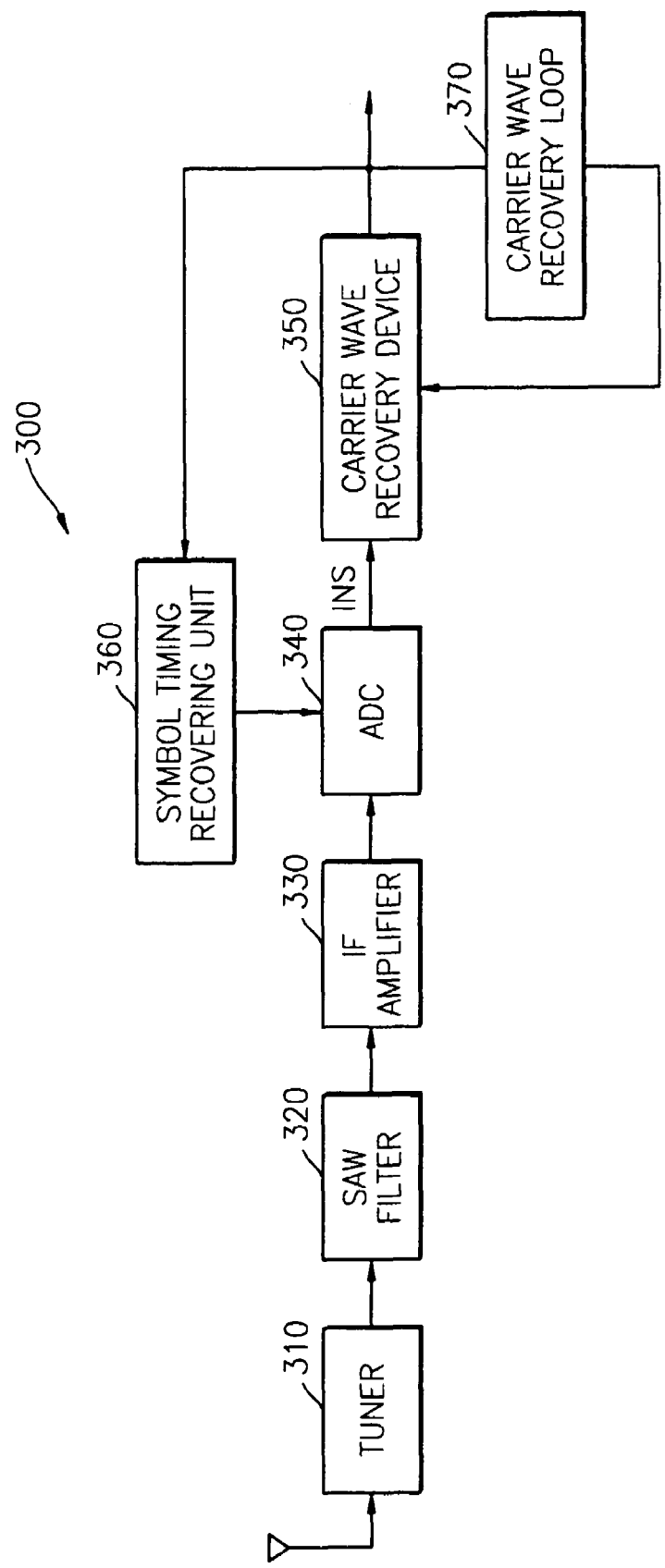
FIG. 3 is a block diagram of a high-definition TV receiver according to the prior art.

The complex input signal COMIS is an input-signal INS that is converted into a complex number signal through a complex filter 405. The input signal INS is a carrier wave signal that may be received, for example, through an antenna, cable conduit, network, or other communication medium; and output as a real-number signal through, for example, the ADC 340 of FIG. 3. The carrier recovery device 400 may be used in a receiver of an 8-level vestigial sideband (VSB) HD TV signal, such as, for example, one that is configured for use in the United States. In such case, the complex input signal COMIS may be a VSB signal that is converted into a complex number.

The complex input signal COMIS, which may include an error, is combined, by, for example, multiplying it with the frequency signal FRQS to generate a complex output signal COMOS. The complex output signal COMOS is based on the complex input signal COMIS but can include error compensation by the use of the frequency signal FRQS. The frequency signal FRQS can be generated by an oscillator 455 in the second error detecting unit 440 that is responsive to signals from the first error detecting unit 425 and/or the second error detecting unit 440. Operation of the first and second error detecting units 425 and 440 is further described below.

The error compensating unit 410 may multiply the complex input signal COMIS by the frequency signal FRQS to generate the complex output signal COMOS. When the complex input signal COMIS is first applied to the error compensating unit 410, the frequency signal FRQS may not contain information that would allow the error compensating unit 410 to compensate for error in the complex input signal COMIS, and accordingly, the complex output signal COMOS may be the same as the complex input signal COMIS.

The switch control signal generator 420 generates a switch control signal SWCONS based on whether or not a pilot signal is detected (sensed) in, for example, the complex input signal COMIS and/or the complex output signal COMOS. Based on the switch control signal SWCONS, the complex output, signal. COMOS is input to the first error detecting unit 425 when the pilot signal is not detected, and to the second error detecting unit 440 when the pilot signal is detected.

The switching unit 415 selectively provides the, complex output signal COMOS to the first or second error detecting unit 425 or 440 based on the switch control signal SWCONS. When the pilot signal detected in, for example, the complex output signal COMOS, the complex output signal COMOS is applied to the second error detecting unit 440. The second error detecting unit 440 receives the complex output signal COMOS and compensates for error in the complex output signal COMOS using the pilot signal.

The second error detecting unit 440 includes a frequency-phase synchronization loop 445 that detects frequency and phase errors of a pilot signal in the complex output signal COMOS; a loop filter 450 that filters an output of the frequency-phase synchronization loop 445; and an oscillator 455 that generates the frequency signal FRQS whose frequency changes in response to an output of the loop filter 450 and an error signal OFFSETS. The operations of the second error detecting unit 440 may be, for example, those of a conventional carrier recovery device, and consequently, further description of those operations will not be provided for brevity.

If the pilot signal is not detected in, for example, the complex output signal COMOS, the switching unit 415 provides the complex output signal COMOS to the first error detecting unit 425 in response to the switch control signal SWCONS.

The first error detecting unit 425 receives the complex output signal COMOS and a real-number signal REALS, which represents a real part of the complex output signal COMOS, and detects the location of an error reference signal in the complex output signal COMOS from the real-number signal REALS. The first error detecting unit 425 measures a variation in a phase angle of the complex output signal COMOS and applies the error signal OFFSETS as the result of the measurement to the oscillator 455 of the second error detecting unit 440.

The error reference signal may be a PN63 signal that is present in a field synchronization signal contained in the complex input signal COMIS. The first error detecting unit 425 detects a frequency offset of the complex output signal COMOS using, for example, the PN63 signal field synchronization signal instead of using the pilot signal. The field synchronization signal may be, for example, repeatedly generated at intervals of 24.2 ms and three PN63 signals may be included in each field synchronization signal.

The sign of a second one the three PN63 signals may change when the field synchronization signal is generated. Consequently, the second PN63 signal of every second field synchronization signal, generated at intervals of 48.4 ms, has the same sign, and which may be used to estimate a frequency offset of the complex output signal COMOS.

The field synchronization signal is detected by the field synchronization detector 430 and the frequency offset of the complex output signal COMOS is estimated by the frequency error measuring unit 435.

The field synchronization detector 430 determines location of a beginning and an end of the error reference signal based on the real-number signal REALS. For example, the field synchronization detector 430 determines the location of the PN63 signal of the field synchronization signal in the complex output signal COMOS, and generates a signal FSO as the result to the frequency error measuring unit 435. Operations for detecting the field synchronization signal from the VSB signal and detecting the PN63 signal from the field synchronization signal may include, for example, those which are well known to those skilled in the art, and thus, further description thereof will be omitted for brevity.

The frequency error measuring unit 435 receives the complex output signal COMOS; measures a variation in a phase angle in response to the signal FSO output from the field synchronization detector 430, using a variation in the position of the error reference signal repeatedly generated, for example, in each, frame; and outputs an error signal OFFSETS as the result of the measurement.

The error signal OFFSETS is calculated by the frequency error measuring unit 435 using, for example, Equation (1) below:

$$\Delta F = 1/(2*\pi*L) \tan^{-1}\left[\sum_{n=0}^{L-1} \text{Im}\{y(n+L)y(n)*\} \Big/ \sum_{n=0}^{L-1} \text{Re}\{y(n+L)y(n)*\}\right], \ldots \quad (1)$$

where $\Delta F$ is the error signal OFFSETS, y(n) is the complex output signal COMOS, y(n+L) is the complex output signal COMOS with a period that is delayed an amount L, y(n)* is a conjugate signal representation of the complex output signal COMOS, and L is the length of a sample of the error reference signal. For example, the length of the PN63 signal sample can be 63, so that L is 63.

Using Equation (1), the phase may be measure for a signal that is provided to the frequency error measuring unit 435, i.e., the complex output signal COMOS. A variation in the frequency offset of the complex output signal COMOS is calculated by, for example, measuring the phase of the complex output signal COMOS in the form of a phase angle with respect to the real axis, and calculating a variation in the phase angle. The variation in the frequency offset is the frequency error of the complex output signal COMOS.

Equation (1) includes operations for multiplying the signal y(n+1), which corresponds to the complex output signal COMOS whose period is delayed by an amount L, by the conjugate signal y(n)* of the complex output signal COMOS, and then, adding the multiplication results together. The term n is an integer from 0 to L−1. These operations may correspond to, for example, correlation operations which are well known to those skilled in the art.

Referring to FIG. 5, the frequency error measuring unit 435 is shown according to some embodiments of the present invention. The frequency error measuring unit 435 may perform operations corresponding to, for example equation (1), using a delayer 510, a conjugate signal generator 520, a first multiplier 530, an imaginary-number generator 540, a real-number generator 550, a second multiplier 560, an operation means 570, and a third multiplier 580. The delayer 510 receives the complex output signal COMOS and delays its period by an amount L. The conjugate signal generator 520 receives the complex output signal COMOS and generates a conjugate complex output signal representing a conjugate of the complex output signal COMOS. The first multiplier 530 multiplies the output of the delayer 510 by the conjugate complex output signal. The imaginary-number generator 540 extracts the imaginary part of the output of the first multiplier. The real-number generator 550 extracts the real part of the output of the first multiplier 530 and generates the reciprocal of the extracted real part. The second multiplier 560 multiplies the output of the imaginary-number generator 540 by the output of the real-number generator 550. The operation means 570 calculates the arctangent of the output of the second multiplier 560. The third multiplier 580 multiplies the output of the operation means 570 by a predetermined coefficient signal COFS to generate the error signal OFFSETS. The coefficient signal COFS is calculated by $1/(2*\pi*L)$, where L is the length of the error reference signal sample.

The error signal OFFSETS generated by the frequency error measuring unit 435 is provided to the oscillator 455 of the second error detecting unit 440. The oscillator 455 may be, for example, a numerically, controlled oscillator. The oscillator 455 generates a frequency signal FRQS based on the error signal OFFSETS. The error compensating unit 410 combines, such as by multiplying, the frequency signal FRQS by the complex input signal COMIS to generate the complex output signal COMOS, in which error is reduced or compensated. The complex output signal COMOS is repeatedly passed through the loops of the first error detecting unit 425, the oscillator 455, and the error compensating unit 410 until, for example, error in the complex output signal COMOS is sufficiently reduced or eliminated. The complex output signal COMOS may be output to the outside of the carrier recovery device 400.

When the switch control signal SWCONS is initially provided to the switching unit 415, the complex output signal COMOS is output to the first error detecting unit 425. When the switch control signal SWCONS is subsequently provided to the switching unit 415, the complex output signal COMOS is output to the second error detecting unit 440. Accordingly, an initial input of the complex output signal COMOS may be provided to the first error detecting unit 425 and generate the error signal OFFSETS as described above.

When the generated error signal OFFSETS is applied to the oscillator 455, the oscillator 455 outputs the frequency signal FRQS. The frequency signal FRQS is combined by, for example, multiplying it with the complex output signal COMIS to generate the complex output signal COMOS. The output signal COMOS is provided to the second error detecting unit 440. The second error detecting unit 440 may thereafter operate, for example, according to a conventional carrier recovery device and perform phase synchronization for recovery of a carrier wave.

Accordingly, frequency and phase errors are detected using the first error detecting unit 425 when the complex output signal COMOS is provided, for example, as an initial input, and detected using the second error detecting unit 440 when the complex output signal COMOS is subsequently provided, for example, after the initial input. Consequently, a carrier recovery device according to the present invention may detect error and recover a carrier wave more quickly than a conventional carrier recovery device having only, 20 for example, the structure shown for the second error detecting unit 440.

Figure 6:
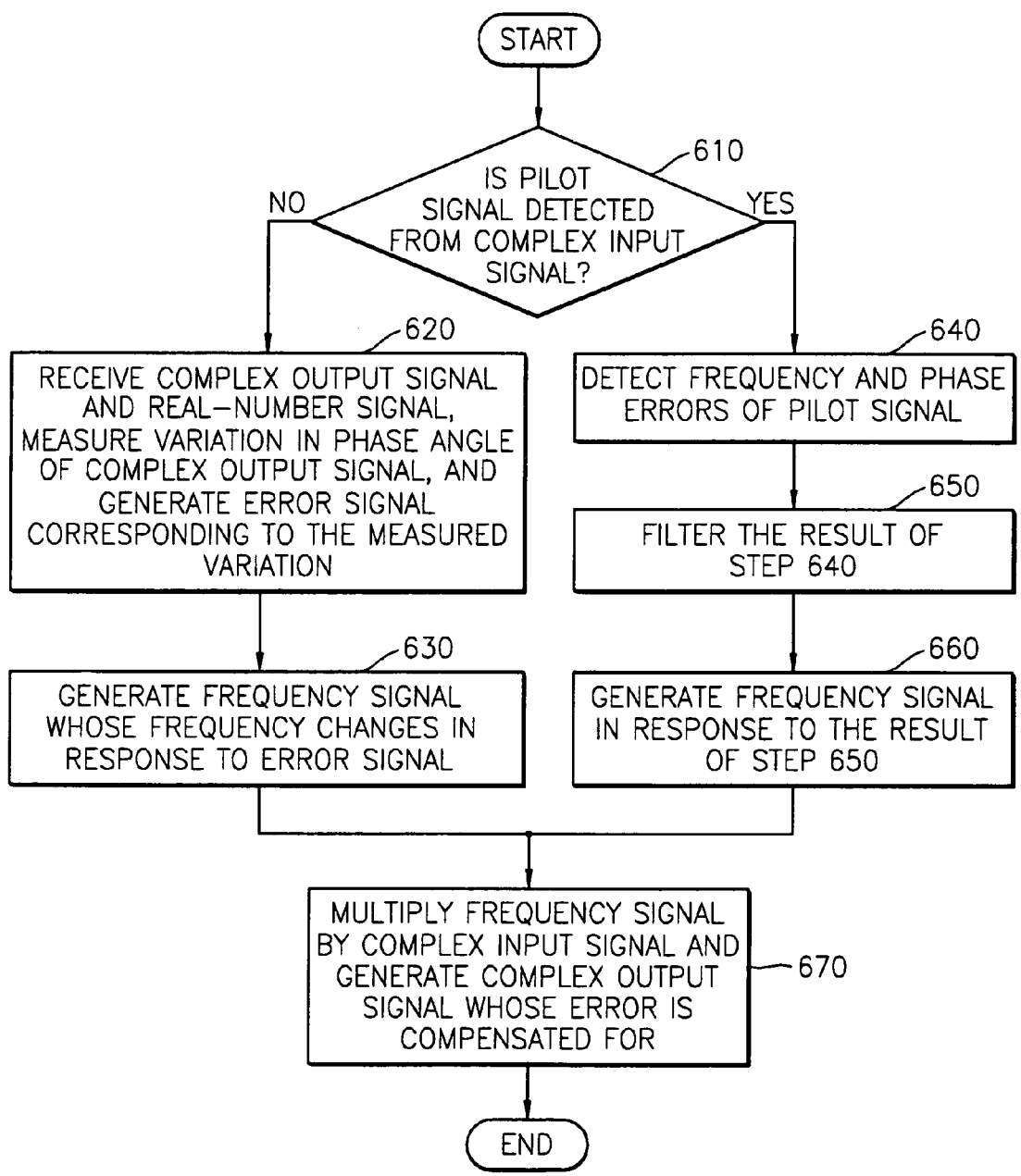
FIG. 6 is a flowchart of operations for recovering a carrier according to the first embodiment of the present invention.
Figure 7:
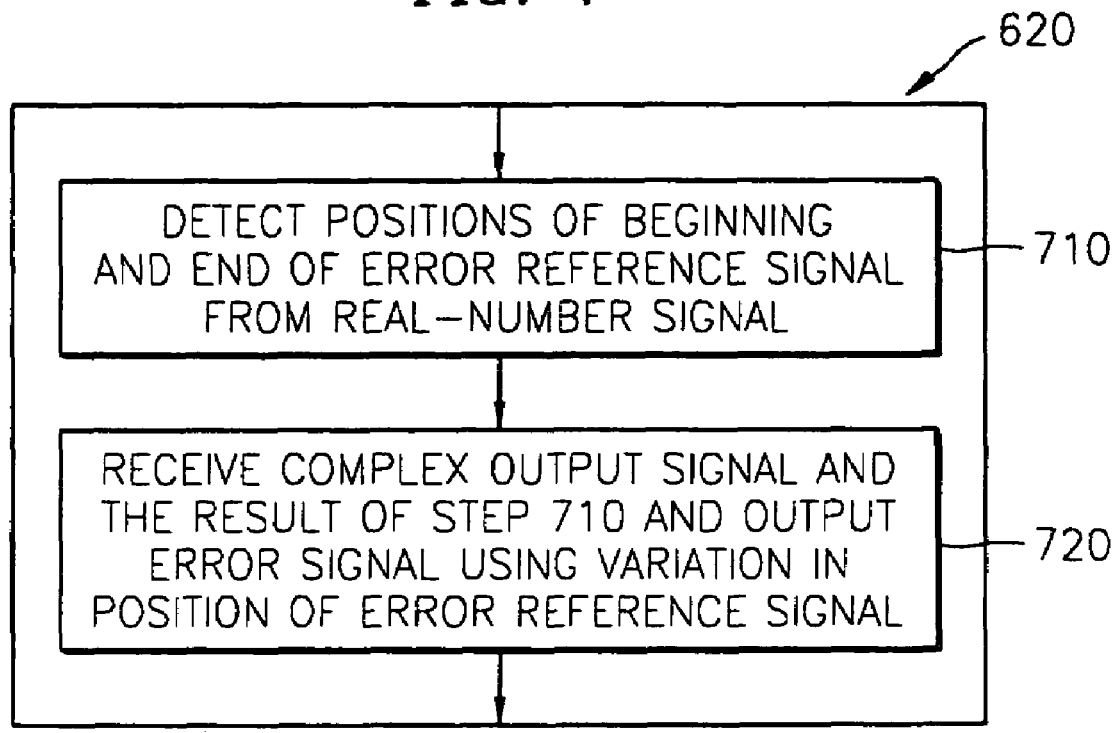
FIG. 7 is a flowchart of operations for determining location of an error reference signal and generating an error signal according to embodiments of the present invention.
Figure 8:
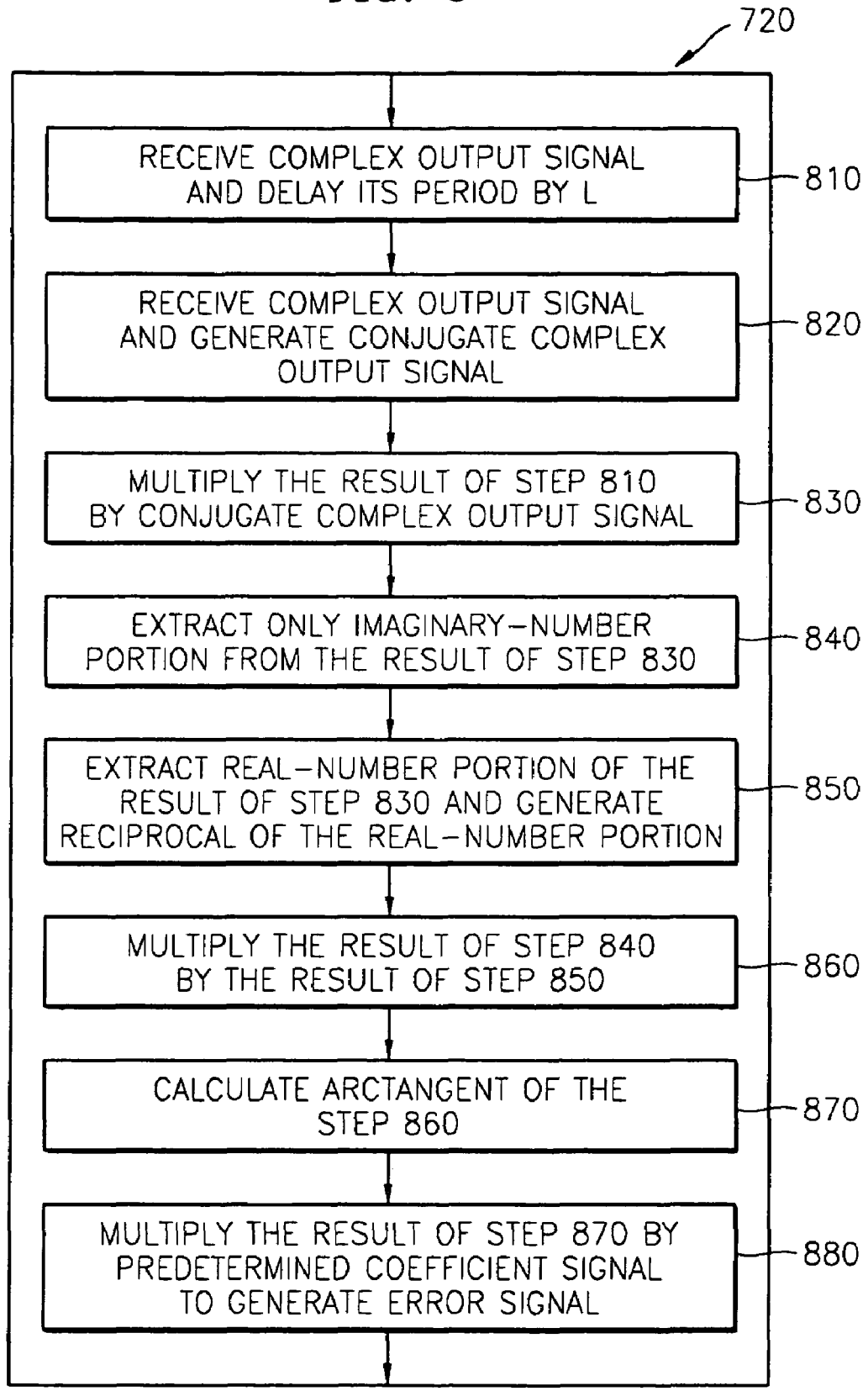
FIG. 8 is a flowchart of operations for generating an error signal, for example, as shown in FIG. 7, according to embodiments of the present invention.

FIG. 6 is a flowchart of operations for recovering a carrier according to a first embodiment of the present invention. FIG. 7 is a flowchart of operations for detecting errors, for example, as described in the flowchart of FIG. 6. FIG. 8 is a flowchart illustrating operations for generating an error signal, for example, as described in FIG. 7. Carrier recovering operations by which error in a complex input signal of an HD TV signal is detected and compensated, will now be described with reference to FIGS. 4 through 8.

In block 610 of FIG. 6, a selection is made between performing a first error detecting function when a pilot signal is not detected in a complex input signal, and performing a second error detecting function when the pilot signal is detected. In block 610, the complex output signal and the complex input signal may refer to the same signal, and the complex input signal may be a vestigial sideband (VSB) signal that is represented as a complex number.

According to the first error detecting function, in block 620, the location of an error reference signal in the complex output signal is determined from a real number portion of the complex output signal. A variation in a phase angle of the complex output signal is measured and the result of the measurement is provided as an error signal. The complex output signal may be the same as the complex input signal.

Block 620 can include blocks 710 and 720 of FIG. 7. In block 710, the location of a beginning and an end of the error reference signal is determined from the real number portion of the complex output signal. The error reference signal may correspond to a PN63 signal in a field synchronization signal of the complex output signal. Block 710 may be performed by the field synchronization detector 430, and the operation thereof may be as was described therewith.

After block 710, a variation in the phase angle of the complex output signal is measured using a variation in the position of the error reference signal, which may be generated per frame of the complex output signal, according to the result of block 710, and the error signal is generated from the measured variation, in block 720. The variation in the phase angle of the complex output signal COMOS corresponds to a variation in a frequency offset of the complex output signal COMOS. That is, the variation in the phase angle of COMOS is a frequency error of the complex output signal, COMOS.

Block 720 will now be described with reference to FIG. 8. Referring to FIG. 8, the period of the complex output signal is delayed by an amount L, in block 810. Next, a conjugate complex output signal is generated as a representation of the conjugate of the complex output signal, in block 820. In block 830, the result of block 810 is combined by, for example, multiplying it with the result obtained from block 820. In block 840, an imaginary portion is extracted from the result of block 830. In block 850, a real part is extracted from the result of block 830 and the reciprocal of the extracted real part is generated. In block 860, the imaginary portion of block 840 is combined, for example, by multiplying it with the reciprocal of block 850. An arctangent of the result of block 850 is generated in block 870. In block 880, the arctangent is combined, for example, by multiplying it with a predetermined coefficient signal to generate the error signal. The coefficient signal is calculated by, for example, the equation $1/(2*\pi*L)$, where L is the length of the sampled error reference signal.

Blocks 810 through 860 may be repeatedly performed a number of times equal to the length of the error reference signal sample, i.e., L times. Blocks 810 through 860 may be related to the operations provided in Equation 1. The operations obtained by repeating blocks 810 through 850 L times, may correspond to a correlation operation. A variation in the phase angle of the complex output signal can correspond to the frequency error of the complex output signal.

Block 720 may be performed by the frequency error measuring unit 435 of FIG. 4, and, therefore, may perform the operations described for the frequency error measuring unit 435. In block 630 of FIG. 6, a frequency signal with a frequency that varies based on the error signal is generated. Block 630 may correspond to the operation of the oscillator 455 of FIG. 4. Error in the complex input signal may be compensated by combining by, for example, multiplying the complex input signal by the frequency signal. In block 670 of FIG. 6, the frequency signal is multiplied by the complex output signal to generate a complex output signal having compensated error. The complex output signal with compensated error is provided outside of the carrier recovery device according to various embodiments of the present invention.

However, when a pilot signal is detected from the complex input signal in block 610 of FIG. 6, the second error detecting function is performed. In the second error detecting function, frequency and phase errors are detected from a pilot signal contained in the complex output signal corresponding to the complex input signal, at block 640. In block 650, the frequency and phase errors are filtered. In block 660, the frequency signal is generated in response to the result of filtering. Block 670 may be performed as described above. The second error detecting function may be performed by the second error detecting unit 440 of FIG. 4, and may therefore operate in the manner described for the second error detecting unit 440.

Figure 9:
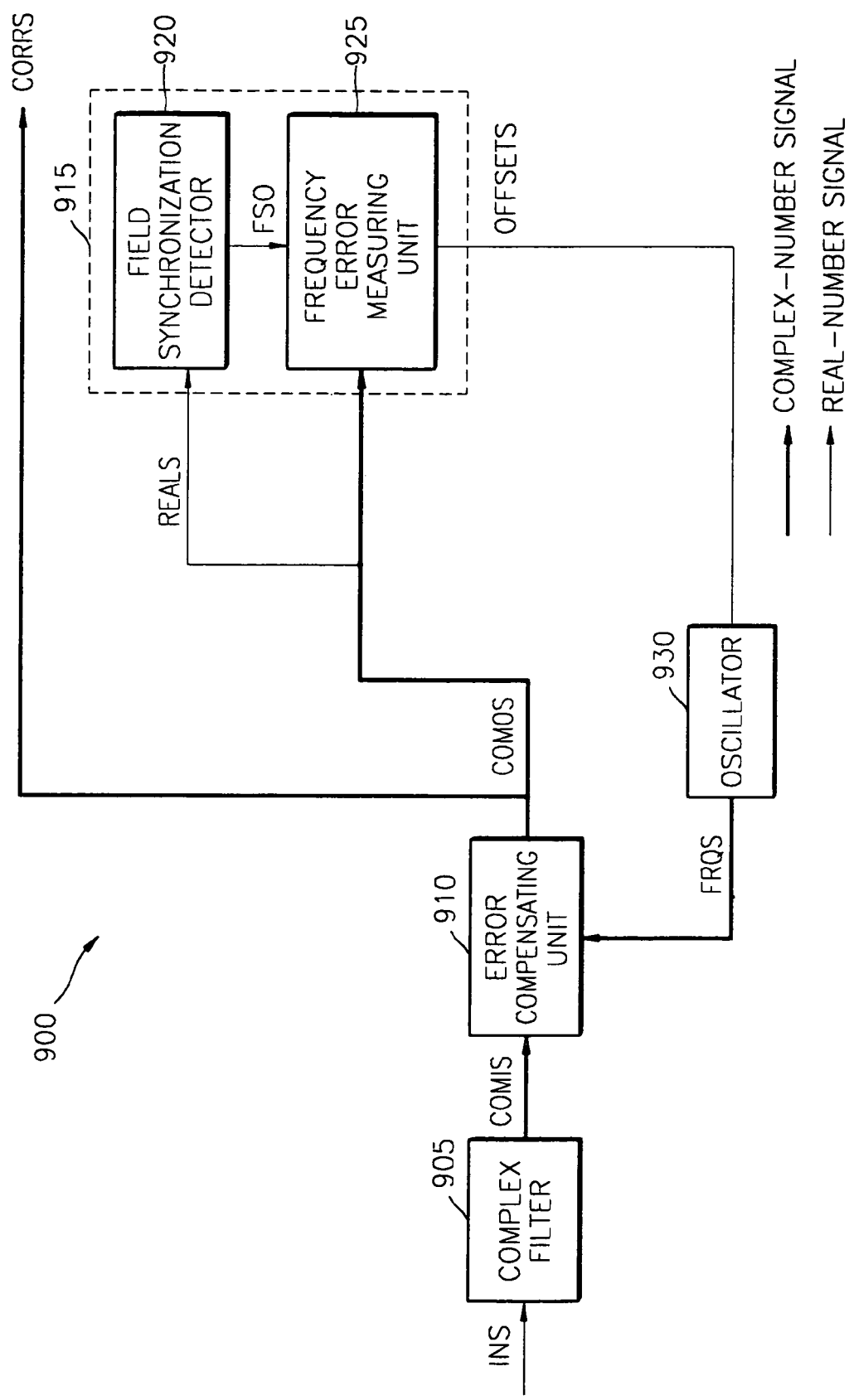
FIG. 9 is a block diagram of a carrier recovery apparatus according to a second embodiment of the present invention.
Figure 10:
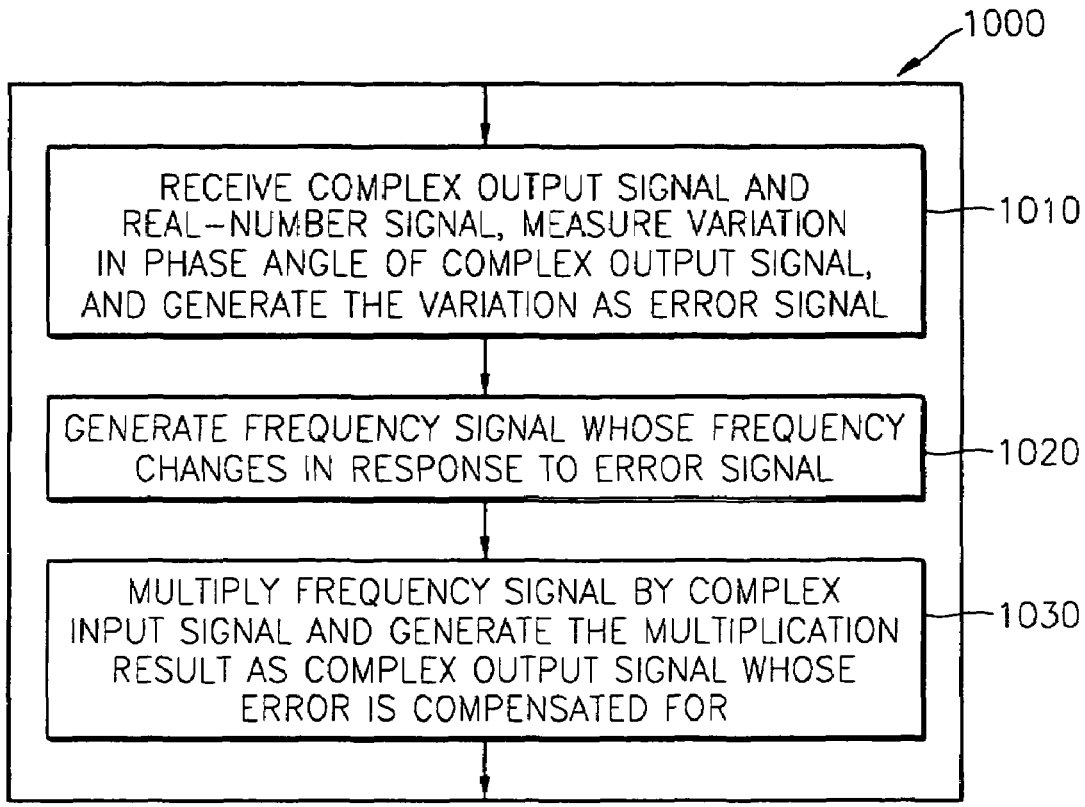
FIG. 10 is a flowchart of operations for recovering a carrier according to the second embodiment of the present invention.
Figure 11:
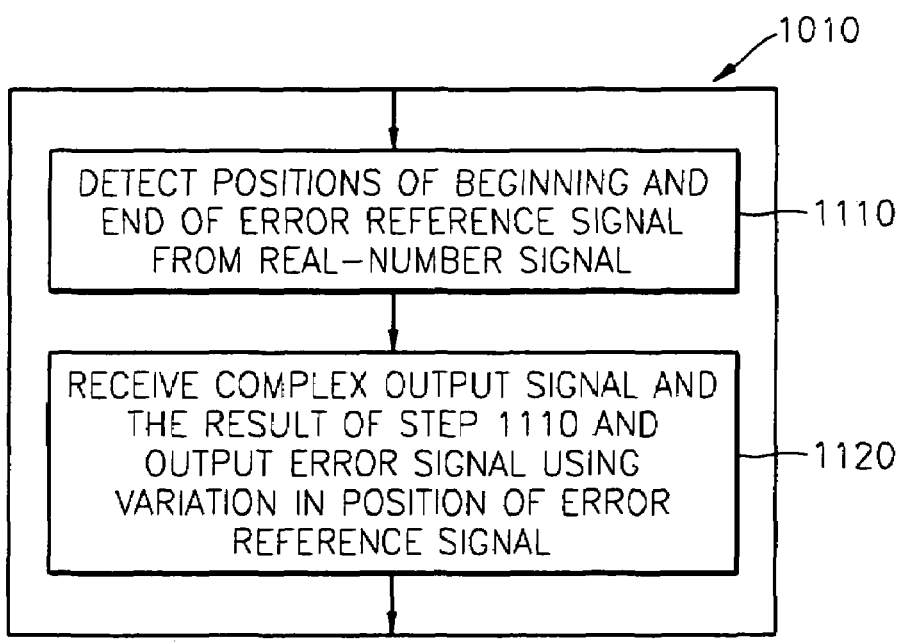
FIG. 11 is a flowchart of operations for generating an error signal, for example, as shown in FIG. 10.

FIG. 9 is a block diagram of a carrier recovery device according to a second embodiment of the present invention. FIG. 10 is a flowchart illustrating operations for recovering a carrier according to a second embodiment of the present invention. FIG. 11 is a flowchart illustrating operations for generating an error signal, for example, as part of the operations illustrated in FIG. 10. An apparatus 900 and operations 1000 relating thereto that recover a carrier wave in a HD TV signal will be described with reference to FIGS. 9 through 11.

Referring to the operations 1000 shown in FIG. 10, in block 1010, a complex output signal, which may be the same as a complex input signal, and a real-number signal, that represents a real number part of the complex output signal, are received. The location of an error reference signal in the complex output signal is determined from the real-number signal, and a variation in a phase angle of the complex output signal is measured to generate the variation as the error signal. Block 1010 may be performed by an error detecting unit 915 in the apparatus 900 of FIG. 9.

Referring to FIG. 9, the apparatus 900 includes an error compensating unit 910, the error detecting unit 915, and an oscillator 930. A carrier signal, which is converted into a digital signal, is provided as an input signal INS to a complex filter 905. The complex filter 905 filters the input signal INS and provides it as a complex input signal COMIS that is a complex number signal. The complex input signal COMIS, that may be initially input to the error compensating unit 910, is provided to the error detecting unit 915 as the complex output signal COMOS whose error may not yet to be compensated. A real-number signal REALS, which represents a real part of the complex output signal COMOS, is also applied to the error detecting unit 915.

Block 1010 of FIG. 10 may include blocks 1110 and 1120 as shown in FIG. 11. In block 1110, the location of the beginning and end of the error reference signal are detected based on the real-number signal. In block 1120, the complex output signal is received, a variation in a phase angle of the complex output signal is measured using a variation in the position of the error reference signal generated per frame of the complex output signal, according to the detected positions, and the variation in the phase angle is output as the error signal. Blocks 1110 and 1120 may be performed by a field synchronization detector 920 and a frequency error measuring unit 925.

The error detecting unit 915 may be configured as shown for the first error detecting unit 425 according to the first embodiment of the present invention. The error measuring unit 925 may include the elements of the frequency error measuring unit 435 shown in FIG. 5.

In block 1020 of FIG. 10, a frequency signal FRQS with a frequency that varies in response to the error signal OFFSETS output from the error detecting unit 915 is generated by the oscillator 930. The frequency signal FRQS is combined by, for example, multiplying it with the complex input signal COMIS to compensate for an error in the complex input signal COMIS.

In block 1030 of FIG. 10, the frequency signal FRQS is applied to the error compensating unit 910 and multiplied by the complex input signal COMIS to generate the complex output signal COMOS whose error is compensated. The complex output signal COMOS may be provided outside of the carrier recovery device 900.

A circuit that measures error in a data signal according to a third embodiment of the present invention will now be described. The circuit may be as shown for the first error detecting unit 425, and consequently, will be referred to as "circuit 425" and reference will be made to FIG. 4. The circuit 425 includes a field synchronization detector 430 and a frequency error measuring unit 435. The circuit 425 detects an error contained in an input data signal COMOS. The data signal may be a VSB signal that is converted into a complex number. A field synchronization signal including three PN63 signals is generated for each field of the VSB signal. The circuit 425 measures an error in the input data signal COMOS using the three PN63 signals and generates the error as an error signal OFFSETS.

The field synchronization detector 430 determines the location of the beginning and the end of an error reference signal in the data signal COMOS from a real-number signal REALS, which represents a real part of the data signal COMOS. The error reference signal may be a PN63 signal in the field synchronization signal of the data signal COMOS.

The frequency error measuring unit 435 measures a variation of a phase angle of the data signal COMOS using a variation in the position of the error reference signal, which is generated per field of the data signal COMOS, in response to a signal FSO from the field synchronization detector 430, and provides the measured variation of the phase angle as the error signal OFFSETS. The frequency error measuring unit 435 may include the same elements shown in FIG. 5. Using the circuit 425, it may be possible to detect an error in the VSB signal from the PN63 signal in the VSB signal, even if a pilot signal is not detected from the VSB signal.

Accordingly, embodiments of the present invention provide apparatus and methods that may quickly recover a carrier even when a pilot signal may be difficult to detect. For example, in some embodiments, a PN63 signal that is contained in a field synchronization signal of a VSB signal is used to recover the carrier.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A carrier recovery apparatus for use in a high-definition TV receiver, comprising:
   an error compensating unit that is configured to combine a complex input signal with a frequency signal to generate a complex output signal, wherein the complex output signal includes an error reference signal, wherein the error reference signal comprises at least one PN signal in a field synchronization signal of the complex input signal, and wherein the PN signal is one of a plurality of PN signals;
   a switching unit that is configured to output the complex output signal selectively between a first output path and a second output path based on a switch control signal;
   a switch control signal generator that is configured to generate the switch control signal based on the presence or absence of a pilot signal in the complex output signal;
   a second error detecting unit that is configured to receive the complex output signal from the first output path of the switching unit, and is configured to generate the frequency signal to compensate for an error in the complex output signal based on the pilot signal in the complex output signal; and a first error detecting unit that is configured to receive the complex output signal from the second output path of the switching unit, and is configured to determine location of the PN signal of the error reference signal in the complex output signal based on a real part of the complex output signal, and is configured to generate the frequency signal based on the determined location of the PN signal of the error reference signal in the complex output signal.

2. The apparatus of claim 1, wherein the first error detecting unit comprises:
a field synchronization detector that is configured to determine location of a beginning and an end of the error reference signal based on the real part of the complex output signal; and
a frequency error measuring unit that is configured to measure a variation in a phase angle of the complex output signal based on the location of the beginning and the end of the error reference signal, and to generate the error signal based on the variation in the phase angle of the complex output signal, wherein the complex output signal is divided into frames, and wherein the frequency error measuring unit is configured to generate the error signal for the frames of the complex output signal.

3. The apparatus of claim 2, wherein the frequency error measuring unit comprises:
a delayer that is configured to delay the period of the complex output signal by a time L to generate a delayed complex data signal;
a conjugate signal generator that is configured to generate a conjugate representation of the complex data signal;
a first multiplier that is configured to multiply the delayed complex data signal by the conjugate representation of the complex data signal to generate a first multiplier output signal;
an imaginary-number generator that is configured to generate an imaginary number portion of the first multiplier output signal;
a real-number generator that is configured to generate a reciprocal representation of a real number portion of the first multiplier output signal;
a second multiplier that is configured to multiply the imaginary number portion of the first multiplier output signal by the reciprocal representation of a real number portion of the first multiplier output signal to generate a second multiplication value;
an operation unit that is configured to generate an arctangent of the second multiplication value; and
a third multiplier that is configured to multiply the arctangent of the second multiplication value by a coefficient signal to generate the error signal.

4. The apparatus of claim 3, wherein the coefficient signal is generated by the equation $1/(2*\pi*L)$, wherein L is a length in time of a sample of the error reference signal sample.

5. The apparatus of claim 2, wherein the frequency error measuring unit generates the error signal using the following equation:

$$\Delta F = 1/(2*\pi*L)\tan^{-1}\left[\sum_{n=0}^{L-1} \text{Im}\{y(n+L)y(n)*\} \Big/ \sum_{n=0}^{L-1} \text{Re}\{y(n+L)y(n)*\}\right],$$

wherein $\Delta F$ is the error signal, n is a sample number, y(n) is the complex output signal, y(n+L) is the complex data signal with a period that is delayed by an amount L, y(n)* is a conjugate signal of the complex output signal, and L is a length in time of a sample of the error reference signal.

6. The apparatus of claim 1, wherein the second error detecting unit comprises:
a frequency-phase synchronization loop that is configured to generate frequency and phase error values based on the pilot signal in the complex output signal;
a loop filter that is configured to filter the frequency and phase error values; and
an oscillator that is configured to generate the frequency signal with a frequency that varies based on at least one of the filtered frequency and phase error values and the error reference signal.

7. The apparatus of claim 1, wherein the complex input signal is a vestigial sideband (VSB) signal that is represented as a complex number, and wherein the error reference signal is a PN63 signal in a field synchronization signal of the complex input signal.

8. The apparatus of claim 1, wherein the switching unit is configured to provide the complex output signal to the first error detecting unit when the switch control signal generator senses the pilot signal in the complex output signal, and to provide the complex output signal to the second error detecting unit when the switch control signal generator does not sense the pilot signal in the complex output signal.

9. The apparatus of claim 1, wherein the complex output signal comprises an initial output signal and subsequent output signals, and wherein the switching unit is configured to provide the initial output signal to the first error detecting unit and to provide the subsequent output signal to the second error detecting unit.

10. A carrier recovery apparatus comprising:
an error compensating unit that is configured to combine a complex input signal with a frequency signal to generate a complex output signal, wherein the complex output signal includes an error reference signal, wherein the error reference signal comprises at least one PN signal in a field synchronization signal of the complex input signal, and wherein the PN signal is one of a plurality of PN signals;
an error detecting unit that is configured to determine location of the PN signal of the error reference signal in the complex output signal based on a real part of the complex output signal, and is configured to generate an error signal based on the determined location of the PN signal of the error reference signal in the complex output signal; and
an oscillator that is configured to generate the frequency signal with a frequency that varies based on the error signal.

11. The apparatus of claim 10, wherein the error detecting unit comprises:
a field synchronization detector that is configured to determine location of a beginning and an end of the error reference signal based on the real part of the complex output signal; and
a frequency error measuring unit that is configured to measure a variation in a phase angle of the complex output signal based on the location of the beginning and the end of the error reference signal that is determined by the field synchronization detector, and is configured to generate the error signal based on the variation in the phase angle of the complex output signal.

12. The apparatus of claim 11, wherein the complex output signal is divided into frames, and wherein the frequency error measuring unit is configured to generate the error signal for each of the frames of the complex output signal.

13. The apparatus of claim 11, wherein the frequency error measuring unit generates the error signal based on the following equation:

$$\Delta F = 1/(2*\pi*L)\tan^{-1}\left[\sum_{n=0}^{L-1} \text{Im}\{y(n+L)y(n)*\} \Big/ \sum_{n=0}^{L-1} \text{Re}\{y(n+L)y(n)*\}\right],$$

wherein ΔF is the error signal, n is a sample number, y(n) is the complex output signal, y(n+L) is the complex output signal with a period that is delayed by an amount L, y(n)* is a conjugate signal of the complex output signal, and L is a length in time of a sample of the error reference signal.

14. The apparatus of claim 10, wherein the complex input signal is a VSB signal that is represented as a complex number, and wherein the error reference signal is a PN63 signal in a field synchronization signal of the complex input signal.

15. A circuit for measuring an error in a complex data signal, comprising:
a field synchronization detector that is configured to determine location of a beginning and an end of an error reference signal in the complex data signal based on a real number representation of the complex data signal; and
a frequency error measuring unit that is configured to measure a variation in a phase angle of the complex data signal based on the location of the error reference signal in the complex data signal, and is configured to generate an error signal based on the variation in the phase angle of the complex data signal,
wherein the error reference signal comprises at least one PN signal in a field synchronization signal of the complex input signal, and the PN signal is one of a plurality of PN signals,
wherein the location of the error reference signal is the location of the PN signal.

16. The circuit of claim 15, wherein the complex data signal is divided into frames, and wherein the frequency error measuring unit is configured to generate the error signal for each frame of the complex data signal.

17. The circuit of claim 15, wherein the complex data signal is a VSB signal that is represented by a complex number, and wherein the error reference signal is a PN63 signal in a field synchronization signal of the complex data signal.

18. A circuit for measuring an error in a complex data signal, comprising:
a field synchronization detector that is configured to determine location of a beginning and an end of an error reference signal in the complex data signal based on a real number representation of the complex data signal; and
a frequency error measuring unit that is configured to measure a variation in a phase angle of the complex data signal based on the location of the error reference signal in the complex data signal, and is configured to generate an error signal based on the variation in the phase angle of the complex data signal, wherein the frequency error measuring unit comprises:
a delayer that is configured to delay the period of the complex data signal by a time L to generate a delayed complex data signal;
a conjugate signal generator that is configured to generate a conjugate representation of the complex data signal;
a first multiplier that is configured to multiply the delayed complex data signal by the conjugate representation of the complex data signal to generate a first multiplier output signal;
an imaginary-number generator that is configured to generate an imaginary number portion of the first multiplier output signal;
a real-number generator that is configured to generate a reciprocal representation of a real number portion of the first multiplier output signal;
a second multiplier that is configured to multiply the imaginary number portion of the first multiplier output signal by the reciprocal representation of the real number portion of the first multiplier output signal to generate a second multiplication value;
an operation unit that is configured to generate an arctangent of the second multiplication value; and
a third multiplier that is configured to multiply the arctangent of the second multiplication value by a coefficient signal to generate the error signal.

19. The circuit of claim 18, wherein the coefficient signal is generated by the equation 1/(2*π*L), wherein L is a length in time of a sample of the error reference signal sample.

20. A circuit for measuring an error in a complex data signal, comprising:
a field synchronization detector that is configured to determine location of a beginning and an end of an error reference signal in the complex data signal based on a real number representation of the complex data signal; and
a frequency error measuring unit that is configured to measure a variation in a phase angle of the complex data signal based on the location of the error reference signal in the complex data signal, and is configured to generate an error signal based on the variation in the phase angle of the complex data signal, wherein the frequency error measuring unit generates the error signal using the following equation:

$$\Delta F = 1/(2*\pi*L)\tan^{-1}\left[\sum_{n=0}^{L-1} \text{Im}\{y(n+L)y(n)*\} \Big/ \sum_{n=0}^{L-1} \text{Re}\{y(n+L)y(n)*\}\right],$$

wherein ΔF is the error signal, n is a sample number, y(n) is the complex data signal, y(n+L) is the complex data signal with a period that is delayed by an amount L, y(n)* is a conjugate representation of the complex data signal, and L is a length in time of a sample of the error reference signal.

21. A method of recovering a carrier in a complex high-definition TV signal, the method comprising:
detecting the presence or absence of a pilot signal in the complex high-definition TV signal;
selecting between performing a first error detecting function on the complex high-definition TV signal and performing a second error detecting function on the complex high-definition TV signal based on the detected presence or absence of the pilot signal in the complex high-definition TV signal;
combining the complex high-definition TV signal with a frequency signal to generate a complex output signal, wherein the complex output signal includes an error reference signal, wherein the error reference signal comprises at least one PN signal in a field synchronization signal of the complex high-definition TV signal, and wherein the PN signal is one of a plurality of PN signals, and wherein the performing a first error detecting function comprises:

determining location of the PN signal of the error reference signal in the complex output signal based on a real part of the complex output signal;

generating an error signal based on the determined location of the PN signal of the error reference signal in the complex output signal; and generating the frequency signal with a frequency that varies based on the error signal.

22. The method of claim 21, wherein the performing a first error detecting function comprises:

determining location of a beginning and an end of the error reference signal based on the real part of the complex output signal;

measuring a variation in a phase angle of the complex output signal based on the location of the beginning and the end of the error reference signal; and generating the error signal based on the variation in the phase angle of the complex output signal.

23. The method of claim 21, wherein the performing a first error detecting function comprises:

delaying the period of the complex output signal by a time L to generate a delayed complex output signal;

generating a conjugate representation of the complex output signal;

multiplying the delayed complex output signal by the conjugate representation of the complex output signal to generate a first multiplier output signal;

multiplying an imaginary number portion of the first multiplier output signal by a reciprocal representation of a real number portion of the first multiplier output signal to generate a second multiplication value;

generating an arctangent of the second multiplication value; and multiplying the arctangent of the second multiplication value by a coefficient signal to generate the error signal.

24. The method of claim 23, wherein the coefficient signal is generated by the equation $1/(2*\pi*L)$, wherein L is the length in time of a sample of the error reference signal.

25. The method of claim 21, wherein in (b2) the error signal is generated using the following equation:

$$\Delta F = 1/(2*\pi*L)\tan^{-1}\left[\sum_{n=0}^{L-1}\text{Im}\{y(n+L)y(n)*\}\Big/\sum_{n=0}^{L-1}\text{Re}\{y(n+L)y(n)*\}\right],$$

wherein $\Delta F$ is the error signal, n is a sample number, y(n) is the complex output signal, y(n+L) is the complex output signal with a period that is delayed by an amount L, y(n)* is a conjugate representation of the complex output signal, and L is a length in time of a sample of the error reference signal.

26. The method of claim 21, wherein the complex output signal is a VSB signal that is represented as a complex number, and wherein the error reference signal is a PN63 signal in a field synchronization signal of the complex high-definition TV signal.

27. The method of claim 21, wherein the performing a second error detecting function comprises:

determining frequency and phase errors in the pilot signal in the complex high-definition TV signal;

filtering the frequency and phase errors; and generating the frequency signal based on the filtered frequency and phase errors.

28. A method of recovering a carrier in a complex high-definition TV signal, the method comprising:

combining the complex high-definition TV signal with a frequency signal to generate a complex output signal, and wherein the complex output signal includes an error reference signal, wherein the error reference signal comprises at least one PN signal in a field synchronization signal of the complex input signal, and wherein the PN signal is one of a plurality of PN signals;

determining location of the PN signal of the error reference signal in the complex output signal based on a real part of the complex output signal;

generating an error signal based on the determined location of the PN signal of the error reference signal in the complex output signal; and generating the frequency signal with a frequency that varies based on the error signal.

29. The method of claim 28, wherein determining location of the error reference signal in the complex output signal comprises:

determining location of a beginning and an end of the error reference signal based on the real part of the complex output signal; and measuring a variation in a phase angle of the complex output signal based on the location of the beginning and the end of the error reference signal; and generating the error signal based on the variation in the phase angle of the complex output signal.

30. The method of claim 29, wherein the error signal is generated by the following equation:

$$\Delta F = 1/(2*\pi*L)\tan^{-1}\left[\sum_{n=0}^{L-1}\text{Im}\{y(n+L)y(n)*\}\Big/\sum_{n=0}^{L-1}\text{Re}\{y(n+L)y(n)*\}\right],$$

wherein $\Delta F$ is the error signal, n is a sample number, y(n) is the complex output signal, y(n+L) is the complex output signal with a period that is delayed by an amount L, y(n)* is a conjugate representation of the complex output signal, and L is a length in time of a sample of the error reference signal.

31. The method of claim 28, wherein the complex high-definition TV signal is a VSB signal that is represented by a complex number, and wherein the error reference signal is a PN63 signal in a field synchronization signal of the complex high-definition TV signal.

* * * * *